United States Patent

Loefeel et al.

[11] 3,804,630
[45] Apr. 16, 1974

[54] PHOTOGRAPHIC SILVER HALIDE LIGHT-SENSITIVE MATERIAL CONTAINING AZO DYES

[75] Inventors: Hansrolf Loefeel, Berne; Bernhard Piller, Marly-le-Petit; Alfred Froehlich, Marly-le-Grand, all of Switzerland

[73] Assignee: Ciba-Geigy AG, Basle, Switzerland

[22] Filed: June 30, 1972

[21] Appl. No.: 267,779

Related U.S. Application Data

[63] Continuation of Ser. No. 46,798, June 16, 1970, abandoned.

[30] Foreign Application Priority Data
Sept. 1, 1967 Switzerland................... 12299/67

[52] U.S. Cl................ 96/99, 96/73, 260/152, 260/153, 260/156, 260/169, 260/174, 260/196
[51] Int. Cl............................................ G03c 1/10
[58] Field of Search........................... 96/99, 73

[56] References Cited
UNITED STATES PATENTS

| | | | |
|---|---|---|---|
| 3,178,291 | 4/1965 | Mory et al. | 96/99 |
| 3,322,543 | 5/1967 | Anderau | 96/99 |
| 3,443,953 | 5/1969 | Loeffel | 96/99 |
| 3,455,695 | 7/1969 | Piller | 96/99 |
| 3,539,348 | 11/1970 | Vetter et al. | 96/99 |
| 3,716,368 | 2/1973 | Froehlich et al. | 96/99 |

Primary Examiner—J. Travis Brown
Attorney, Agent, or Firm—Joseph G. Kolodny; Stanley A. Marcus; Edward McC. Roberts

[57] ABSTRACT

Photographic, light-sensitive material, especially for the silver dyestuff bleaching process is provided. This material is characterized in that it contains on a support in at least one layer a linear acylamino azo dyestuff of the formula

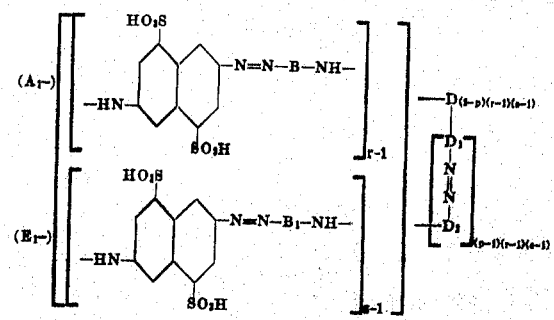

wherein $B$ and $B_1$ are aromatic radicals, $A_1$, $D_1$ and $D$ are acyl radicals, $D_1$ and $D_2$ each is a monocyclic radical bonded to the -NH-groups by an acyl group, $p$, $r$ and $s$ each are 1 or 2, the sum of $r$ and $s$ being at least 3 and the number of azo groups present in the molecule being $(r-1) + (s-1) + (p-1)(s-1)$. This material contains these dyestuffs especially as yellow image dyestuffs. The dyestuffs have favorable absorption properties, are fast to diffusion and have good resistance to oxidizing agents.

13 Claims, No Drawings

PHOTOGRAPHIC SILVER HALIDE LIGHT-SENSITIVE MATERIAL CONTANING AZO DYES

This is a continuation of application Ser. No. 46,798, filed June 16, 1970, now abandoned.

The present invention provides linear azo dyestuffs of formula

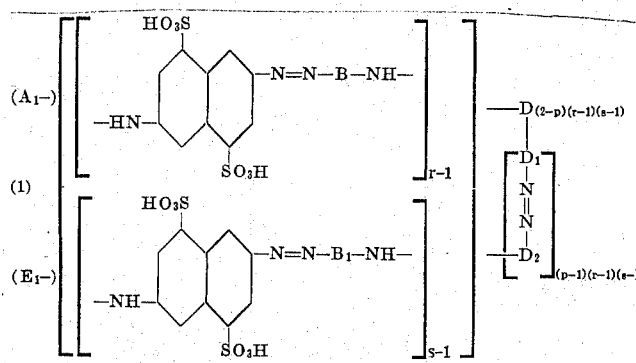

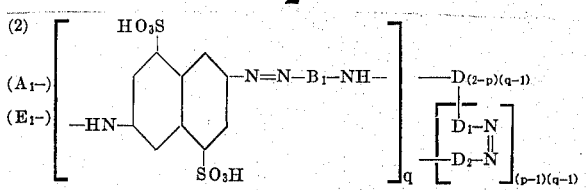

wherein B and $B_1$ each represents a benzene or naphthalene residue bonded in the 1,4-position to the -N = N- and the -NH- group, $A_1$, $E_1$ and D each represents an acyl residue, $D_1$ and $D_2$ each represents a monocyclic residue bonded to the -NH- groups by an acyl group, and p, r and s each represents an integer having a value of at most 2, with the sum of r and s being at least 3 and the number of azo groups present in the molecule being $(r - 1) + (s - 1) + (p - 1)(r - 1)(s - 1)$.

If the sum of $r + s$ is 3, then the dyestuffs of formula (1) are monoazo dyestuffs. If the sum of $r + s$ is 4, that is to say both r and s have a value of 2, then it is further necessary to differentiate the dyestuffs of formula (1) wherein p = 1 from those wherein p = 2.

If p has a value of 1, the dyestuffs of formula (1) represent disazo dyestuffs. If p = 2, the dyestuffs of formula (1) represent linear trisazo dyestuffs.

By the term linear azo dyestuffs or linear trisazo dyestuffs there are to be understood dyestuffs which contain all the azo groups in the following schematic arrangement in the molecule:

.... N = N .... N = N .... N = N ....

Azo dyestuffs having branched molecular chains which, for example, show an arrangement of the azo groups in the molecule of the type indicated below, are not to be understood under the term linear azo dyestuffs of linear trisazo dyestuffs:

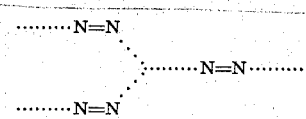

Depending on the type of linkage and the meanings of B, $B_1$, $A_1$, $E_1$, D, $D_1$ and $D_2$ the dyestuffs of formula (1) are symmetrical or asymmetrical linear azo dyestuffs. In the pairs B and $B_1$, $A_1$ and $E_1$, $D_1$ and $D_2$ the two residues may thus, in each case, either be identical or different from one another.

Preferred linear azo dyestuffs are those of formula wherein $A_1$, $E_1$, $B_1$, D, $D_1$, $D_2$, and p have the meanings given above and q is 1 or 2.

Especially valuable linear azo dyestuffs correspond to the formula

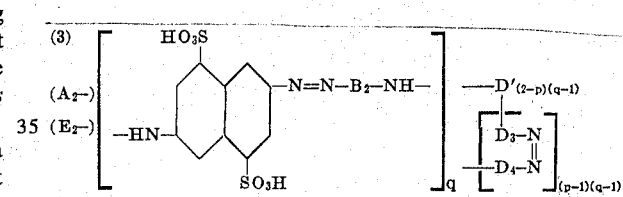

wherein $B_2$ represents a benzene residue which is bonded in the 1,4-position to the -N = N- and the -NH- group, $A_2$ and $E_2$ each represents an acyl residue derived from a carboxylic acid or sulphonic acid, preferably each representing an $R_1$-CO- or $R_2$-$SO_2$-residue, wherein $R_1$ represents a hydrogen atom, an alkyl, alkoxy, carboxyalkyl or vinyl residue or a benzene, furan, thiophene or pyridine residue each of which may be substituted and $R_2$ represents an alkyl or a benzene residue which may be substituted, D' represents a -CO- residue, a residue of an aliphatic, aromatic or heterocyclic dicarboxylic acid, a residue of an aromatic disulphonic acid, 1,3,5-triazine or pyrimidine residue which may each be substituted, $D_3$ and $D_4$ each represents a benzene residue bonded to the -NH- groups via a carbonyl or sulphonyl group and p and q are each integers having a value of at most 2, the number of azo groups present in the molecule being $q + (p - 1)(q - 1)$.

D' preferably corresponds to a -CO-, -CO-F-CO- or -$SO_2$-$F_1$-$SO_2$-residue, wherein F represents an alkylene residue having 2 to 10 carbon atoms, a benzene residue which may be substituted by an amino, nitro, sulphonic acid or sulphonamide group, a furan, thiophene or pyridine residue, the residue of a diphenylsulphone or a -CH = CH- residue, and $F_1$ represents a benzene residue, which may be substituted.

The residue -$D_3$-N = N-$D_4$- preferably corresponds to the formula (4a) 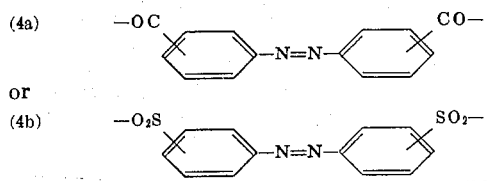

or (4b) 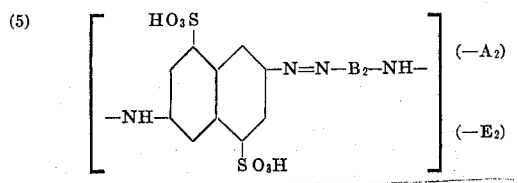

D' may optionally also represent a -CO-F$_2$-SO$_2$- residue, wherein F$_2$ represents a benzene residue, which may be substituted, a methylene residue or a halogenomethylene residue.

Monoazo dyestuffs preferably correspond to the formula (5) 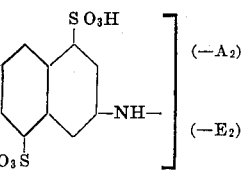

wherein B$_2$, A$_2$ and E$_2$ have the meanings given above.

Disazo dyestuffs preferably correspond to one of the formulae (6) to (8):

(6) 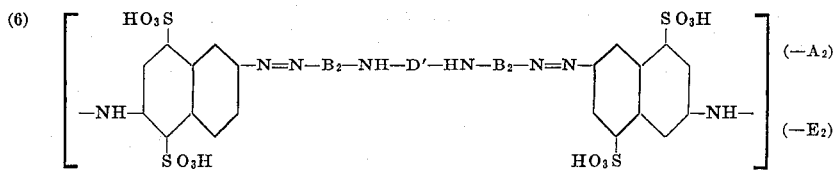

(7) 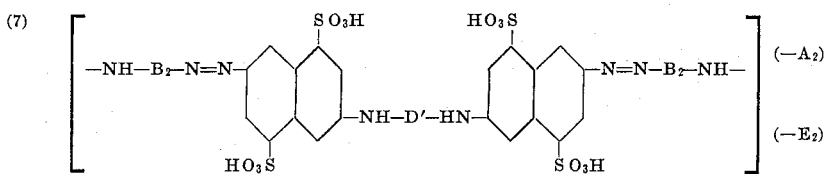

(8) 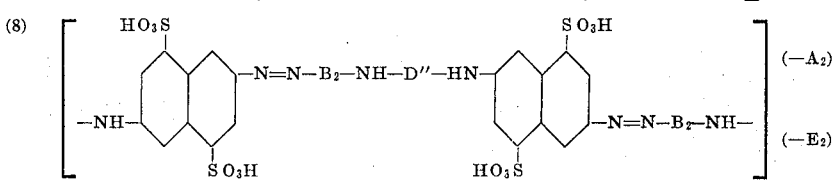

wherein D'' represents a 1,3,5-triazine or a pyrimidine residue each of which may be substituted and A$_2$, E$_2$, D' and B$_2$ have the meanings given above.

Valuable disazo dyestuffs of formula (6) correspond to the formula (9) 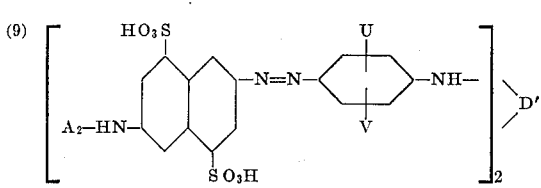

and especially to the formula

(10) 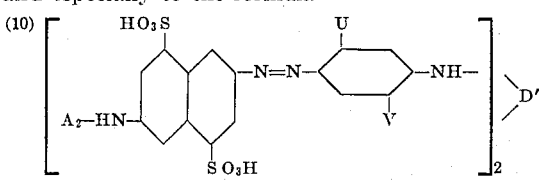

wherein A$_2$ and D' have the meanings given above, U represents a hydrogen atom, a chlorine atom, an alkyl, alkoxy, hydroxyalkoxy or alkoxyalkoxy group each having 1 to 5 carbon atoms in the alkyl residue, an oxy acetic acid group or an acylamino group, wherein acyl represents the residue of an aliphatic carboxylic acid having 1 to 5 carbon atoms or benzenecarboxylic, pyridinecarboxylic, furanecarboxylic or thiophenecarboxylic acid residue, which may each be substituted and V represents a hydrogen atom or an alkyl, alkoxy or acylamino group, wherein acyl has the meaning given above.

Very suitable disazo dyestuffs of formula (10) correspond to the formulae

(11) 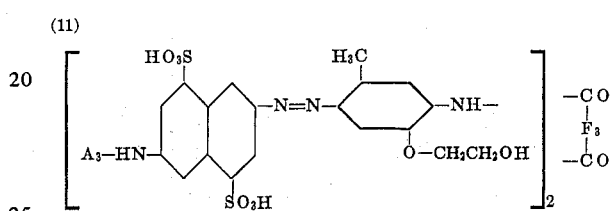

and

(12) 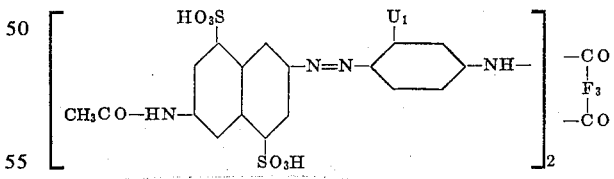

wherein A$_3$ represents an acetyl, benzoyl or p-toluyl residue, U$_1$ represents an acetylamino or carboxypropionylamino residue and F$_3$ represents a residue of formula

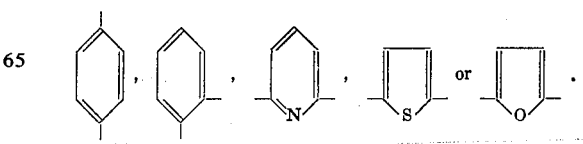

Valuable disazo dyestuffs of formula (6) correspond to the formula

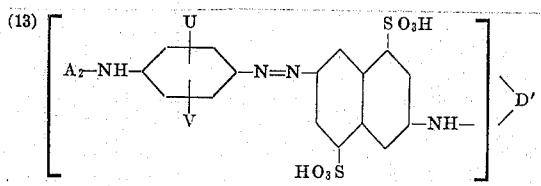

and especially to the formula

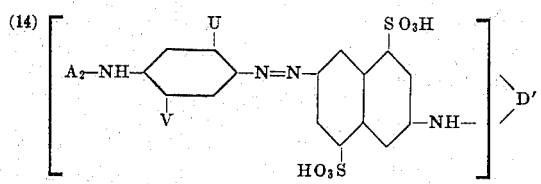

wherein $A_2$, $D'$, $U$ and $V$ have the meanings given above.

Valuable disazo dyestuffs of formula (8) correspond to the formula

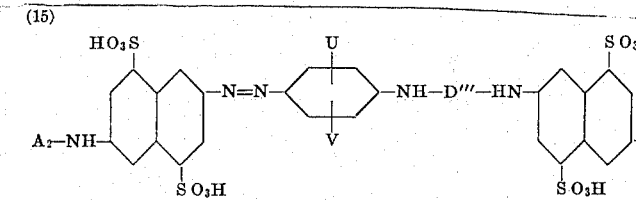

and especially the formula

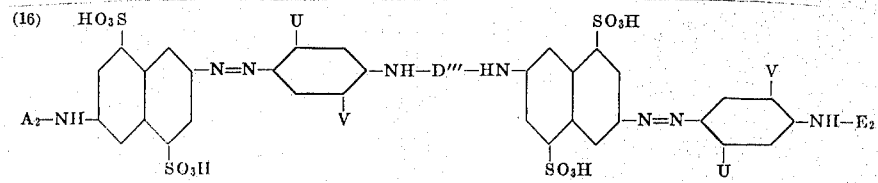

wherein $D'''$ represents a 1,3,5-triazine residue which may be substituted by a chlorine atom or a hydroxyl or alkoxy group, and $A_2$, $E_2$, $U$ and $V$ have the meanings given above. $D'''$ may optionally also be represented by a 1,3,5-triazine residue which is substituted by an alkylamino or phenylamino group.

Alkyl radicals of any kind in the present dyestuffs preferably have 1 to 10 carbon atoms, more particularly 1 to 5 carbon atoms and above all 1 to 3 carbon atoms. Any halogen atoms in the present dyestuffs preferably are bromine, iodine and above all chlorine.

The acyl residues $A_1$, $E_1$, $A_2$ and $E_2$ are derived from anhydrides and especially from halides of monobasic acylation components. The following may be mentioned as examples of halides: Acetyl chloride, propionyl chloride, 3-sulphobenzoyl chloride, benzenesulphonyl chloride, p-toluenesulphonyl chloride, terephthalic acid monomethyl ester-monocarboxylic acid chloride, chloracetyl chloride, 3-chloropropionyl chloride, 2,3-dichloropropionyl chloride, acrylic acid chloride, phenyl-acetic acid chloride, benzoyl chloride, p-nitrobenzoyl chloride, 4-methylbenzoyl chloride, 3-trifluoromethyl-benzoyl chloride, 4-chlorobenzoyl chloride, 4-methoxybenzoyl chloride, furoyl chloride, thienyl chloride, nicotinic acid chloride, chloroformic acid ethyl ester or chloroformic acid diethylamide. Anhydrides from which the acyl residues are derived are for example acetic anhydride or anhydrides of aliphatic carboxylic acids having 3 to 5 carbon atoms.

The acyl residues $D$, $D'$, $D''$ and $D'''$ are also derived from anhydrides and especially from dihalides of dibasic acylation components.

The following may, for example, be mentioned as anhydrides: Succinic anhydride, chlorosuccinic anhydride or glutaric anhydride.

Preferably, however, the bridge members $D$, $D'$, $D''$, $D'''$, $-D_1-N=N-D_2-$ and $-D_3-N=N-D_4-$ are derived from dihalides, namely, for example from, phosgene, thiophosgene, succinic acid dichloride, glutaric acid dichloride, adipic acid dichloride, pimelic acid dichloride, chlorosuccinic acid dichloride, 2,3-dichlorosuccinic acid dichloride, fumaric acid dichloride, terephthaloyl chloride, isophthaloyl chloride, 5-nitroisophthaloyl chloride, thiophene-2,5-dicarboxylic acid dichloride, furane-2,5-dicarboxylic acid dichloride, pyridine-2,5-dicarboxylic acid dichloride, pyridine-2,6-dicarboxylic acid dichloride, pyridine-3,5-dicarboxylic acid dichloride, azobenzene-3,3'-dicarboxylic acid dichloride, 4,4'-dichlor-azobenzene-3,3'-dicarboxylic acid dichloride, azobenzene-4,4'-dicarboxylic acid dichloride, 2,2'-dimethylazobenzene-5,5'-dicarboxylic acid dichloride, 2,2'-dimethoxyazobenzene-5,5'-dicarboxylic acid dichloride, 2,2'-dimethylazobenzene-4,4'-dicarboxylic acid dichloride, 4-methoxy-azobenzene-3,4'-dicarboxylic acid dichloride, 3,3'-dichlorazobenzene-4,4'-dicarboxylic acid dichloride, azobenzene-4,4'-disulphonic acid dichloride, azobenzene-3,3'-disulphonic acid dichloride, diphenylsulphone-(1,1')-4,4'-dicarboxylic acid dichloride, benzene-1,3-disulphonyl chloride, diphenylmethane-4,4'-dicarboxylic acid dichloride, diphenylsulphide-4,4'-dicarboxylic acid dichloride, cyanuric chloride, 4,6-dichloropyrimidine, 1-phenyl-3,5-dichloro-sym. triazine or 1-methoxy-3,5-dichloro-sym. triazine.

The residues $B_1$ and $B_2$ are derived from coupling components for the manufacture of azo components. The following amines may here be mentioned as examples:

aminobenzene, 1-amino-2- or -3-methylbenzene, 1-amino-2,5-or -2,6-dimethylbenzene, 1-amino-2- or -3-methoxybenzene, 1-amino-2-ethoxybenzene, 1-amino-2-β-hydroxyethoxy-5-methylbenzene, 1-amino-2-β-hydroxyethoxybenzene, 1-amino-2-β-hydroxyethoxy- 5-chlorobenzene, 1-amino-2-β-methoxyethoxy-5-methylbenzene, 1-amino-3-acetylaminobenzene, 1-amino-3-propionylaminobenzene, 1-amino-3-n-butyrylaminobenzene, 1-amino-3-isobutyrylaminobenzene, 1-amino-3-acetylamino-6-methylbenzene, 1-amino-3-acetylamino-6-methoxybenzene, 1-amino-2-acetylamino-5-methylbenzene, 1-amino-2-acetylamino-5-methoxybenzene, 1-amino-2-methoxy-5-methylbenzene, 1-amino-2-methyl-5-methoxybenzene, 1-amino-2-chloro-5-methoxybenzene, 1-amino-2-methoxy-5-chlorobenzene, 1-amino-2-methyl-5-chlorobenzene, 1-amino-3-methoxybenzene, 1-amino-2,5-dimethoxybenzene, 1-amino-2,5-diethoxybenzene, 1-amino-2,5-diacetylaminobenzene, 3-aminophenyl-urea, 3-amino-4-methyl-phenoxyacetic acid, 1-aminonaphthalene-5-sulphonic acid or 1-aminonaphthalene.

The acylamino dyestuffs of formulae (1) to (3) may be manufactured according to various processes.

The present invention thus provides a process for the manufacture of monoazo dyestuffs of formula (5) which comprises condensing, in a molar ratio of 1:1, aminoazo dyestuffs of formula (17)

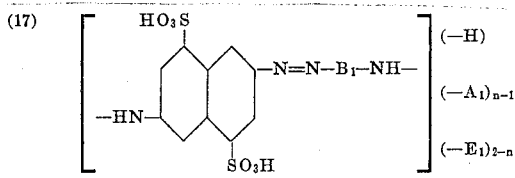

with an anhydride or especially monohalide of an acid of the formula $A_1$-OH or $E_1$-OH, wherein $A_1$, $E_1$ and $B_1$ have the meanings given above and n is 1 or 2. Linear azo dyestuffs of formula (18)

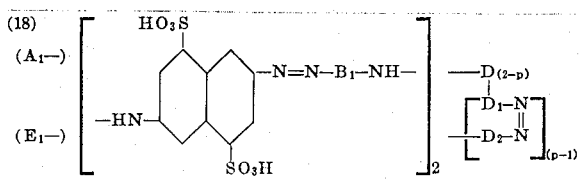

wherein $A_1$, $E_1$, $B_1$, D, $D_1$, $D_2$ and p have the meanings given above are manufactured according to three different processes. One process comprises condensing a halide of a compound of formula (19)

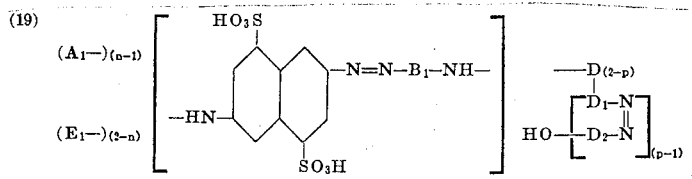

with an aminoazo dyestuff of formula (20)

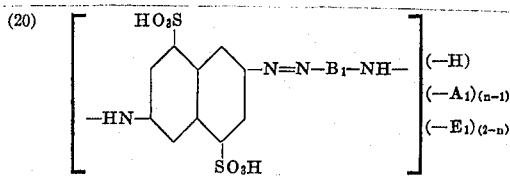

wherein $A_1$, $E_1$, $B_1$, D, $D_1$, $D_2$ and p have the meanings mentioned and n is 1 or 2.

Another process comprises condensing an azo dyestuff of formula (21)

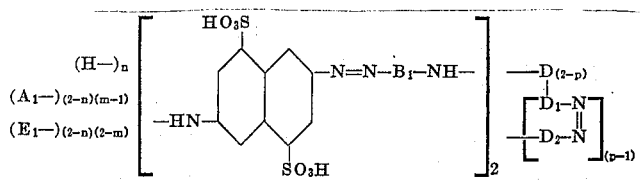

with an anhydride or especially a monohalide of an acid of the formula $A_1$-OH and/or $E_1$-OH, wherein $A_1$, $E_1$, $B_1$, D, $D_1$, $D_2$ and p have the meanings mentioned and n and m is 1 or 2.

A third process comprises condensing an aminoazo dyestuffs of the formula (22)

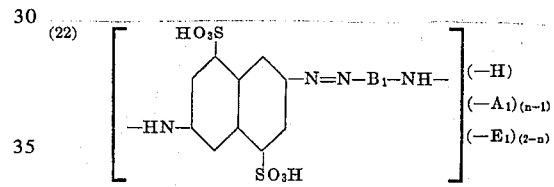

in a molar ratio of 2:1 with a halide of an acid of the formula (23)

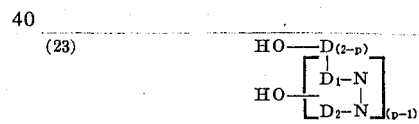

wherein $A_1$, $E_1$, $B_1$, D, $D_1$, $D_2$ and p have the meanings given above.

The condensations are effected according to methods known per se and are advantageously carried out in a polar solvent, for example, water or especially in a polar organic solvent, preferably in dimethylformamide, diethylacetamide or N-methylpyrrolidone.

It can also be advantageous to carry out the condensation in the presence of an acid-binding agent, for example, an alkali metal carbonate. Solvents, for example, pyridine or especially an N-methylpyrrolidone itself already have an acid-binding action.

The linear azo dyestuffs of formula (1) may be used for various purposes, for example in photographic materials and in these are especially advantageously as image dyestuffs for the silver dyestuff bleaching process. In accordance herewith, valuable photographic materials can be manufactured in the usual manner which is in itself known these materials containing, on a layer support, at least one layer with a dyestuff of formula (1).

In particular, these dyestuffs may be present in a multi-layer material which contains, on a layer support, a layer dyed with greenish-blue dyestuff which is selectively sensitive to red, on top of this a layer dyed purple which is selectively sensitive to green and finally a layer dyed yellow with a dyestuff of formulae (1) to (3), preferably (5) to (16), which is sensitive to blue. It is, however, also possible to introduce the dyestuffs of formula (1) into an auxiliary layer or especially into a layer adjacent to the light sensitive layer.

The dyestuffs are in general very resistant to diffusion and can be successfully reduced to give harmless decomposition products which can easily be washed out. They offer very wide possibilities for varying the spectral properties. The dyestuffs are especially distinguished by the purity of the colour shades and by high colour strength.

The extremely favourable course of the spectral absorption curve permits these yellow dyestuffs to be combined in many ways with one each of a suitable purple and bluish-green dyestuff. Grey shades which appear neutral to the eye over the entire density range are thereby achieved.

The dyestuffs of formula (1) are furthermore distinguished by outstanding resistance to oxidising agents such as are used in photographic baths for the oxidation of silver.

The following Examples illustrate the invention.

Unless otherwise states the parts denote parts by weight and the percentages by weight.

EXAMPLE 1

154 parts of 6-acetylamino-2-aminoaphthalene-4,8-disulphonic acid obtained by acetylation of 6-aminonaphthalene-4,8-disulphonic acid, nitration and subsequent reduction of the nitro group with sodium sulphide are dissolved in 2,500 parts of water containing 500 parts of ice. 80 parts of 30% strength hydrochloric acid and 80 parts of 4N sodium nitrite solution are then added at 0° C, whereupon the diazonium salt precipitates in the form of a white emulsion. After vigorous stirring for 2 hours the excess nitrite is destroyed with sulfamic acid.

57 parts of 3-amino-4-methoxy-1-methylbenzene are dissolved in 3,000 parts of water and 30 parts of 30% strength hydrochloric acid by warming to 55° C and cooled to 0° C. The coupling component is then added to the diazo component. After buffering with the requisite quantity of potassium acetate, the coupling starts. The mixture is stirred over night and filtered. The filter cake is suspended in 1,000 parts of water and 200 parts of 2N sodium carbonate. After adding a further 3,500 parts of water the mixture is heated to 65° C, whereupon it dissolves. The dyestuff solution is clarified by filtration and mixed with 200 parts of sodium chloride. The mixture is cooled to 20° C, filtered, and the filter residue is washed with 4,000 parts of acetone. The product is dried at 60° C and 141 parts of an orange-red powder are obtained.

6 parts of the azoamine obtained above are dissolved in 200 parts of water together with 6 parts of crystalline sodium tetraborate. On the other hand, 1 part of thiophenedicarboxylic acid dichloride is warmed in 120 parts of acetone and poured all at once into the solution of the azoamine. The mixture is stirred for 20 hours at room temperature, then warmed to 60° C and 20 parts of 7N potassium acetate solution are added. The precipitated dyestuff is filtered off and the filter residue dissolved in 1,500 parts of water at 90° C; after filtering the solution to clarify it, 250 parts of 7N potassium acetate solution and 1,000 parts of methanol are added. The product is filtered and washed with methanol. After drying 4.8 parts of dyestuff are obtained.

The same dyestuff is obtained if 2-nitro-6-aminonaphthalene-4,8-disulphonic acid is coupled with 3-amino-4-methoxy-1-methylbenzene, the coloured amine linked to thiophenedicarboxylic acid dichloride and the two terminal nitro groups reduced and acetylated.

In both cases the potassium salt of the dyestuff No. I of table I is obtained.

Dyestuffs IV to XVI and XIX to XXXVIII of table I are manufactured analogously. Dyestuff II is manufactured similarly to the reaction with cyanuryl chloride in Example 10.

EXAMPLE 2

1 part of azoamine obtained by coupling of 6-acetylamino-2-aminonaphthalene-4,8-disulphonic acid with 2-acetylamino-5-methoxy-aniline is warmed in 5 parts of N-methyl-pyrrolidone and 0.5 part of pyridine and the solution filtered to clarity it. 0.2 part of terephthaloyl dichloride in the solid form are added at 50° C and the mixture is stirred for 30 minutes at the same temperature, cooled to room temperature, and the dyestuff precipitated by means of 5 parts of 20% alcoholic potassium acetate solution and 5 parts of methanol. The dyestuff is filtered off, boiled in methanol, filtered and the residue washed with methanol. 0.3 part of the potassium salt of the dyestuff No. XVIII of Table I are obtained.

EXAMPLE 3

10 parts of azoamine which have been obtained by coupling 6-acetylamino-2-aminonaphthalene-4,8-disulphonic acid to 3-amino-4-methoxy-1-methylbenzene are dissolved in 500 parts of water together with 5 parts of crystalline sodium tetraborate. 10 parts of 30% strength sodium hydroxide solution are added [→ pH 10], the mixture is warmed to 50° C and phosgene is introduced until a pH valve of 3 is reached. The mixture is then again adjusted to a pH value of 10 with sodium carbonate and phosgene again introduced until a pH value of 3 is reached. The mixture is adjusted to pH 7 to 8 with sodium carbonate and warmed to 60° C after adding 1,500 parts of water. After filtration to clarify the solution, 100 parts of methanol and 50 parts of 7N potassium acetate solution are added. The mixture is filtered and the residue dissolved in 2,000 parts of water at 60° C and 100 parts of methanol and 100 parts of 7N potassium acetate solution are added. The mixture is filtered and the residue is boiled with methanol and dried in vacuo at 60° C. 6 parts of the potassium salt of the dyestuff III of Table I are obtained.

The manufacture of the dyestuff No. XVII and XXXIX is effected analogously.

Before the phosgenation, in the manufacture of dyestuff No. XXXIX, the azoamine obtained by coupling 6-acetylamino-2-aminonaphthalene-4,8-disulphonic acid with 1-amino-3-carboxypropionylaminobenzene is reacted with nitrobenzoyl chloride and the nitro group is reduced.

TABLE I

| | $B_1$ and $D_1$ in formula | | Absorption maximum (nm.) in— | |
|---|---|---|---|---|
| | $\left[ \begin{array}{c} \text{HO}_3\text{S} \\ \text{CH}_3\text{—CO—NH—} \end{array} \right.$ (naphthalene) $\left. \begin{array}{c} \text{—N=N—B}_1\text{—NH—} \\ \text{SO}_3\text{H} \end{array} \right]_2 D_1$ | | | |
| Compound number | $B_1$ | $D_1$ | Gelatine | $H_2O/DMF$ 1:1 |
| I | (methyl, methoxy-phenyl) | —OC—(thiophene)—CO— | 460 | 420 |
| II | Same as above | (dimethyl-chloro-triazine) | 422 | 460 |
| III | do | $\overset{O}{\underset{\|}{-C-}}$ | 446 | 434 |
| IV | do | —OC—(phenyl)—CO— | 455 | 414 |
| V | do | —OC—CH=CH—CO— | 472 | 422 |
| VI | do | —OC—(furan)—CO— | 463/490 | 409 |
| VII | do | —O$_2$S—(phenyl)—N=N—(phenyl)—SO$_2$— | 418 | 422 |
| VIII | do | —O$_2$S—(phenyl)—N=N—(phenyl)—SO$_2$— | 416 | 414 |
| IX | do | —OC—(phenyl)—N=N—(phenyl)—CO— | 448 | 404 |
| X | (methoxy, NHCOCH$_3$-phenyl) | Same as above | 430 | 422 |
| XI | (methyl, OCH$_2$CH$_2$OH-phenyl) | —OC—(phenyl)—N=N—(phenyl-OCH$_3$)—CO— | 443 | 410 |
| XII | Same as above | —OC—(pyridine)—CO— | 406 | 403 |
| XIII | do | —OC—(phenyl)—CO— | 439 | 410 |
| XIV | do | —OC—(phenyl)—CO— | 434 | 406 |
| XV | do | —OC—CH=CH—CO— | 469 | 426 |

Table 1—Continued

B₁ and D₁ in formula:

$$\left[ CH_3-CO-NH-\underset{SO_3H}{\overset{HO_3S}{\text{naphthalene}}}-N=N-B_1-NH- \right]_2 D_1$$

| Compound number | B₁ | D₁ | Absorption maximum (nm.) in Gelatine | H₂O/DMF 1:1 |
|---|---|---|---|---|
| XVI | do | —OC—(furan-2,5-diyl)—CO— | 401 | 408 |
| XVII | do | —CO— | 484 | 432 |
| XVIII | phenyl with H₃CO and HNCOCH₃ substituents | —OC—(phenylene)—CO— | 438 | 406 |
| XIX | Same as above | —OC—(pyridine-2,6-diyl)—CO— | 397 | 406 |
| XX | do | —OC—(phenylene)—CO— | 455 | 412 |
| XXI | phenyl with OCH₂COOH and CH₃ substituents | —OC—(pyridine-2,6-diyl)—CO— | 399 | 400 |
| XXII | Same as above | —OC—(phenylene)—CO— | 414 | 396 |
| XXIII | phenyl with HNCOCH₃ substituent | Same as above | 422 | 408 |
| XXIV | Same as above | —OC—(thiophene-2,5-diyl)—CO— | 430 | 412 |
| XXV | do | —OC—(pyridine-2,6-diyl)—CO— | 404 | 406 |
| XXVI | do | —OC—(phenylene)—CO— | 422 | 406 |
| XXVII | phenyl with OCH₃ substituent | Same as above | 405 | 400 |
| XXVIII | Same as above | —OC—(pyridine-2,6-diyl)—CO— | 404 | 400 |
| XXIX | do | —OC—(phenylene)—CO— | 409 | 402 |

Table I—Continued

| | B₁ and D₁ in formula | | Absorption maximum (nm.) in— | |
|---|---|---|---|---|
| Compound number | B₁ | D₁ | Gelatine | H₂O/DMF 1:1 |
| XXX | H₃C—⌬— | Same as above | 408 | 394 |
| XXXI | Same as above | —OC—⌬(S)—CO— | 416 | 400 |
| XXXII | do | —OC—⌬(N)—CO— | 396 | 394 |
| XXXIII | —⌬— | —OC—⌬—CO— | 396 | 386 |
| XXXIV | Same as above | —OC—⌬(S)—CO— | 420 | 394 |
| XXXV | —⌬—NHCOCH₂CH₂COOH | —OC—⌬—CO— | 442 | 416 |
| XXXVI | Same as above | —OC—⌬(N)—CO— | 402 | 406 |
| XXXVII | do | —OC—⌬(S)—CO— | 435 | 412 |
| XXXVIII | do | —OC—⌬—CO— | 425 | 400 |
| XXXIX | do | —CO— | 430 | 412 |

EXAMPLE 4

A procedure analogous to that described in Example 1 is followed for the manufacture of the dyestuffs of formulae XL to XLVIII of Table II. However, the 6-benzoylamino-naphthalene-4,8-disulphonic acid or 6-p-toluyl-aminonaphthalene-4,8-disulphonic acid, respectively, are used as the diazo component instead of the 6-acetylamino-2-aminonaphthalene-4,8-disulphonic acid.

TABLE II

| | A₁ and D₁ in the formula | | Absorption maximum (nm.) in— | |
|---|---|---|---|---|
| Compound number | A₁ | D₁ | Gelatine | H₂O/DMF 1:1 |
| XL | —⌬—CO— | —OC—⌬(N)—CO— | 408 | 406 |

Table II—Continued

A₁ and D₁ in the formula $$\left[ \begin{array}{c} \text{A}_1\text{—HN—}\underset{\text{SO}_3\text{H}}{\overset{\text{HO}_3\text{S}}{\text{naphthalene}}}\text{—N=N—}\underset{\text{OCH}_2\text{CH}_2\text{OH}}{\overset{\text{H}_3\text{CO}}{\text{benzene}}} \right]_2 \text{D}_1 $$

| Compound number | A₁ | D₁ | Absorption maximum (nm.) in— Gelatine | H₂O/DMF 1:1 |
|---|---|---|---|---|
| XLI | Same as above | —OC—⬡—CO— | 430 | 404 |
| XLII | do | —OC—⬡—CO— | 440 | 410 |
| XLIII | do | —OC—(thiophene)—CO— | 455 | 415 |
| XLIV | do | —OC—(furan)—CO— | 402 | 408 |
| XLV | H₃C—⬡—CO— | —OC—(pyridine)—CO— | 406 | 460 |
| XLVI | Same as above | —CO—⬡—CO— | 412 | 405 |
| XLVII | do | —OC—⬡—CO— | 442 | 408 |
| XLVIII | do | —CO—(thiophene)—CO— | 408 | 406 |

EXAMPLE 5

35 parts of 6-nitro-2-naphthylamine-4,8-disulphonic acid are suspended in 500 parts by volume of dry pyridine and mixed at the boiling point, during 30 minutes, with 84 parts of p-toluenesulphonic acid chloride added in portions. After complete reaction, that is to say after 1 to 2 hours, the p-toluenesulphonic acid derivative is precipitated by means of 35% strength hydrochloric acid in the form of a yellow powder. The yield is almost quantitative.

50 parts of this p-toluenesulphonic acid derivative of formula (a)
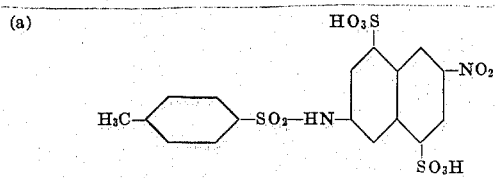

are dissolved in 200 parts by volume of water at a pH value of 8 and at 40° C. 0.5 part of FeCl₃ are added followed by a solution of 37 parts of Na₂S · 9H₂O in 90 parts by volume of water added during 5 minutes with good stirring. The mixture is stirred at 40° C and after 2 hours a further 20 parts of Na₂S · 9H₂O are added to complete the reaction.

The reaction solution which now contains the amine of the p-toluenesulphonic acid derivative is further processed in the usual manner, by diazotisation and coupling onto 2-methoxy-5-methylaniline, to give the amino-monoazo dyestuff of formula (b)
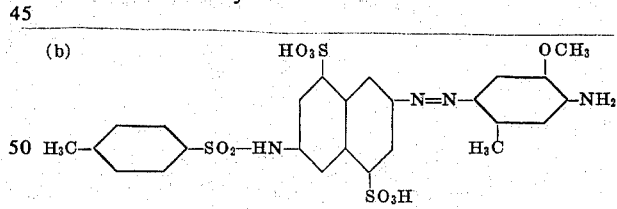

1.2 parts of this amino-monoazo dyestuff, well-dried, are dissolved in 35 parts by volume of anhydrous N-methyl-5-pyrrolidone and 0.2 part of isophthaloyl chloride are added. The mixture is stirred at room temperature and the course of the reaction is followed by thin layer chromatography. The addition of isophthaloyl chloride is repeated two more times at intervals of 6 hours in order to complete the reaction.

200 parts by volume of water are added to the reaction mixture and the dyestuff formed is precipitated with 35% strength hydrochloric acid. After filtering off, washing with water and acetone and drying in vacuo at 80° C 10 parts of the dyestuff No. XLIX are obtained in the form of a yellow powder.

The dyestuffs No. L to LII of Table III are obtained in an analogous manner.

thus obtained is benzoylated according to the method described below.

TABLE III

—$D_1$— in the compound of Formula

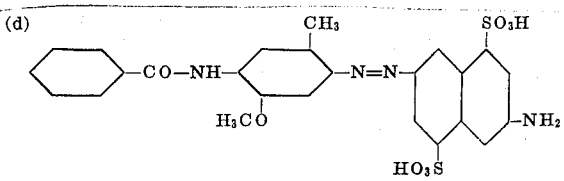

| Dyestuff (number) | | Absorption maximum (nm.) in— | |
|---|---|---|---|
| | | Gelatine | $H_2O$/DMF 1:1 |
| XLIX | -OC-◯-CO- | 414 | 420 |
| L | -OC-◯(S)-CO- | 430 | 443 |
| LI | -OC-◯-$SO_2$-◯-CO- | 412 | 444 |
| LII | -$O_2S$-◯-N=N-◯-$SO_2$- | 404 | 400 |

EXAMPLE 6

The dyestuff No. LIII of Table IV can be manufactured according to two different methods:

A. 35 parts of 6-nitro-2-naphthylamine-4,8-disulphonic acid are dissolved in 500 parts by volume of water under neutral conditions and phosgenated under weakly alkaline conditions with the requisite amounts of crystalline sodium tetraborate being added in portions. Finally, the mixture is heated to 60° C during 10 minutes and the product is filtered off at 40° C and recrystallised from water. 33.4 parts (92%) of pure urea derivative are obtained in the form of a yellow powder.

The two nitro groups of this urea derivative are reduced to amine groups as described in Example 4. The diamine thus produced is tetrazotised and coupled onto 2-methoxy-5-methylaniline. A solution of 10 parts of the diaminodisazo dyestuff of formula

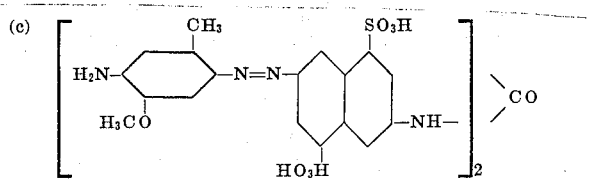

thus obtained, in 250 parts by volume of N-methyl-5-pyrrolidone, is then treated with 8.3 parts by volume of benzoyl chloride, the mixture is stirred at room temperature until it has completely reacted, and the resulting dyestuff is precipitated in the form of a yellow powder by means of 2,000 parts by volume of acetone. The yield of dyestuff No. LIII is 85%. The dyestuffs No. LIV and LV of Table IV are manufactured analogously.

B. 6-nitro-2-naphthylamine-4,8-disulphonic acid is diazotised in the usual manner, coupled with 2-methoxy-5-methylaniline, and the monoazo dyestuff After the reduction of the nitro compound to the amine according to the method described in Example 4, 1.1 part of the amino-monoazo dyestuff of formula (d)

thus produced are phosgenated according to the method described under A. 0.8 part of the dyestuff No. LIII are obtained in the form of a yellow powder.

EXAMPLE 7

10 parts of the diaminodisazo dyestuff of formula (c) are dissolved in 100 parts by volume of water with addition of the requisite quantity of 30% strength sodium hydroxide solution and 100 parts by volume of acetic anhydride are added. This mixture is heated to boiling during 1½ hours, whilst stirring and under reflux, and the precipitated product is filtered off, washed with ethanol and acetone and dried in vacuo at 80° C.

8 parts of the dyestuff No. LVI are obtained in the form of a yellow powder.

EXAMPLE 8

The dyestuff No. LVII is obtained analogously to example 6, method A.

The starting product of formula (e)

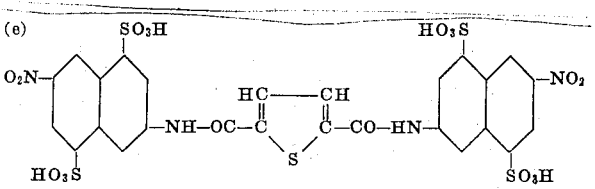

is obtained in the following manner:

35 parts of 6-nitro-2-naphthylamine-4,8-disulphonic acid are suspended in 500 parts by volume of dry nitrobenzene and treated with 50 parts by volume of N,N-dimethylamine, 100 parts by volume of dry acetone and 10.5 parts of thiophene-2,5-dicarboxylic acid dichloride. The reaction vessel is then filled with glass beads of 5 mm diameter to the extent that there is a 10 mm supernatant layer of liquid. The mixture is stirred at 80° to 85° C under a reflux condenser until the reaction is ended (24 to 48 hours), with the addition of the acid dichloride being repeated twice more at intervals of 10 hours. The reaction product is filtered off, suspended in 1,000 parts by volume of 2N sodium carbonate solution, filtered off, thoroughly washed with water and ethanol and dried in vacuo at 60° C.

40 parts of the acylated product of formula (e) are obtained in the form of a yellow powder.

(LVIII)

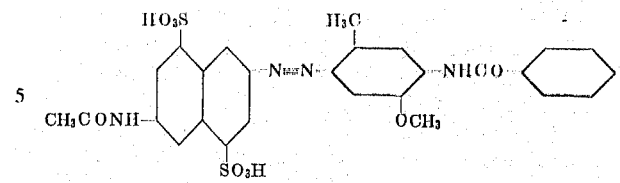

are obtained as an orange powder.

EXAMPLE 10

44 parts of azoamine obtained by coupling 2-nitro-6-aminonaphthalene-4,8-disulphonic acid onto 3-amino-4-hydroxyethoxy-1-methylbenzene are dissolved in 1,250 parts of water. 20 parts of acetic anhydride are added, whereupon the reaction mixture becomes viscous. After one hour the thin layer chromatogram shows that as yet very little acetylated product is pres-

TABLE IV $A_1$ and $D_1$ in the compound of Formula $$\left[ A_1\text{-HN-}\underset{H_3CO}{\overset{CH_3}{\diagup\!\!\!\diagdown}}\text{-N=N-}\underset{HO_3S}{\overset{SO_3H}{\diagup\!\!\!\diagdown}}\text{-NH-} \right]_2 D_1$$

| Dyestuff number | $A_1$– | $-D_1-$ | Absorption maximum (nm.) in Gelatine | $H_2O/$ DMF 1:1 |
|---|---|---|---|---|
| LIII | ⟨◯⟩–CO– | –CO– | 429 | 418 |
| LIV | [S]–CO– | –CO– | ——— | 416 |
| LV | CH₃–⟨◯⟩–SO₂– | –CO– | ——— | 412 |
| LVI | CH₃CO– | –CO– | ——— | 420 |
| LVII | ⟨◯⟩–CO– | –OC–[S]–CO– | 426 | 410 |

EXAMPLE 9

3.1 parts of azoamine obtained by coupling of 2-amino-6-acetylaminonaphthalene-4,8-disulphonic acid onto 3-amino-4-methoxy-methylbenzene, are dissolved in 100 parts of water, together with 3 parts of crystalline sodium tetraborate, by warming to 50° C. After cooling to 20° C a mixture of 12 parts of benzoyl chloride and 15 parts of acetone is added. In order to maintain a neutral medium, a further 3 parts of crystalline sodium tetraborate and 10 parts of a 30% strength solution of sodium hydroxide are added. After stirring for 14 hours at room temperature the mixture is warmed to 80° C and precipitated with 10 parts of 7N potassium acetate solution, whereupon a light brown precipitate is produced. The mixture is filtered, the residue dissolved in 400 parts of water at 60° C, the solution is filtered to clarify it and treated with 5 parts of 7N potassium acetate solution and 400 parts of methanol. The mixture is filtered and the residue is suspended in methanol, filtered and dried in vacuo at 60° C. 1.5 parts of the potassium salt of the dyestuff ent. 600 parts of acetic anhydride are now added dropwise at 60° to 70° C over the course of 3 hours and the mixture is kept at pH 5 by simultaneous addition of 70 parts of a 30% strength solution of sodium hydroxide. The reaction mixture gradually redissolves and the colour becomes visibly lighter. The mixture is precipitated with 200 parts of 7N potassium acetate solution and 100 parts of methanol and the product filtered off and washed with methanol. 33 parts of an orange powder are obtained. 30 parts of the product obtained above are dissolved in 1,000 parts of water at 40° C. 10 parts of sodium sulphide (100%) in 50 parts of water are then added in portions. The reaction is ended after 3 hours. The product is precipitated with 200 parts of 7N potassium acetate solution. After filtering and drying 24 parts of the potassium salt of the azo dyestuff of formula (f)

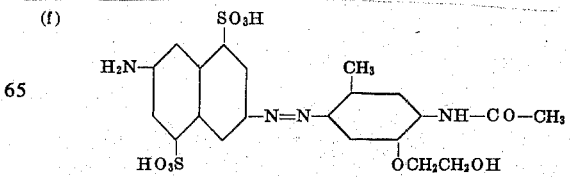

are obtained as a yellow powder.

3.1 parts of azoamine obtained by coupling 2-amino-6-acetylamino-naphthalene-4,8-disulphonic acid with 3-amino-4-methoxy-1-methylbenzene are dissolved in 250 parts of water together with 5 parts of crystalline sodium tetraborate. The mixture is cooled to 0° C and 1 part of cyanuryl chloride dissolved in 50 parts of acetone is added. After 15 minutes reaction time the primary condensation is ended. (Check by thin layer chromatography). The mixture is now warmed to 40° C and 3.1 parts of the intermediate product of formula (f) are added. After 12 hours reaction time only a little diazotisable amine remains detectable in a thin layer chromatogram. 300 parts of water are added and the mixture warmed to 50° C, whereupon dissolution occurs. 30 parts of 7N potassium acetate solution and 100 parts of methanol are then added. A product is filtered off, washed with methanol, and the residue dissolved in 500 parts of water at 50° C. The dyestuff is again precipitated by adding 30 parts of 7N potassium acetate solution and 100 parts of methanol. The mixture is filtered and the residue suspended in 400 parts of methanol, again filtered off and dried in vacuo at 60° C. 3.5 parts of the potassium salt of the dyestuff having similar properties is obtained, but in the second condensation the mixture is, after 24 hours reaction at 50° C, warmed to 70° C for a further 2 hours.

Table V

| Dyestuff No. | Absorption maximum in nm | |
|---|---|---|
| | in gelatine | in H$_2$O/DMF 1 : 1 |
| LVIII | 406 | 404 |
| LIX | 424 | 414 |
| LX | 412 | 411 |

EXAMPLE 11

1.1 parts of the amino-monoazo dyestuff of formula (f), described in Example 9, are dissolved in 25 parts of anhydrous N-methyl-5-pyrrolidone, 0.25 parts of thiophene-2,5-dicarboxylic acid dichloride are added, the mixture is stirred for 3 hours at room temperature, 30 parts of water are added, and the reaction product is precipitated by means of 35% strength hydrochloric acid, filtered off and thoroughly washed with acetone.

The dyestuff of formula LXI is obtained in almost

LIX
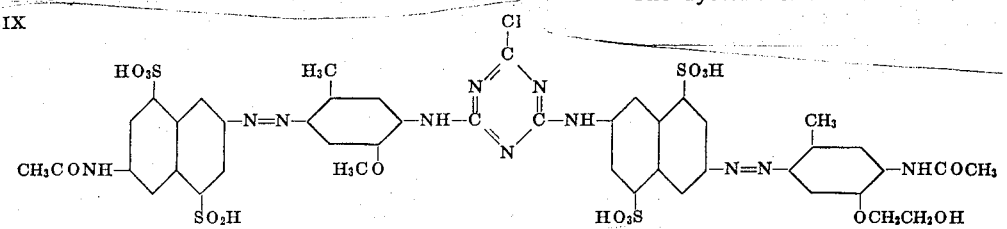

are obtained as a reddish-brown powder.

If instead of trichlorotriazine, 2,4-dichloro-6-methoxy-1,3,5-triazine are used, the dyestuff quantitative yield in the form of a black powder.

The dyestuffs LXII to LXV of Table VI are obtained in an analogous manner.

LX
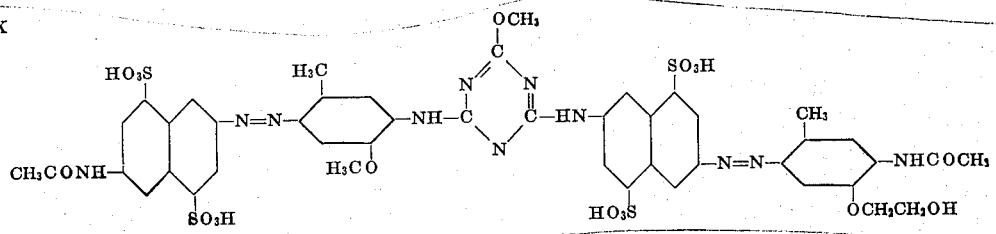

TABLE VI

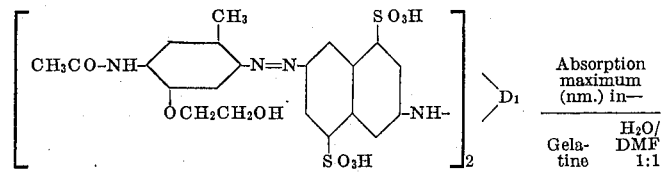

| Dyestuff number | D$_1$ in the compound of Formula | Absorption maximum (nm.) in— | |
|---|---|---|---|
| | | Gelatine | H$_2$O/DMF 1:1 |
| LXI | —OC—[thiophene]—CO— | 436 | 414 |
| LXII | —OC—[pyridine]—CO— | 418 | 410 |
| LXIII | —OC—[benzene]—CO— | 428 | 410 |
| LXIV | —OC—[benzene]—SO$_2$—[benzene]—CO— | ——— | 405 |
| LXV | —CO—[benzene]—CO— | 414 | 410 |

EXAMPLE 12

0.7 parts by volume of a 1% strength aqueous solution of the dyestuff No. I of Table I are added at 40° C to 3.3 parts by volume of a 6% strength aqueous gelatine. 3.3 parts by volume of a gelatine-silver bromide emulsion at 40° C are added thereto, as are, optionally, 1 to 2 parts by volume of an aqueous solution of a spreading agent, for example saponin, and of a hardener, for example dimethylolurea. This mixture is cast onto a 13 cm. 18cm glass plate and dried.

The material is then exposed behind a step wedge and the silver image is developed in a 1-methylamino-4-hydroxybenzenesulphate-hydroquinone developer and fixed.

The image dyestuff is bleached in a bath which in 1,000 parts by volume contains 30 to 100 parts by volume of 32% strength hydrochloric acid, 40 to 120 parts of potassium bromide, 30 to 50 parts of thiourea and 0.001 to 0.01 parts of 2-amino-3-hydroxyphenazine, as a function of the amount of silver present.

After an intermediate soaking the excess silver is removed in a bath which in 1,000 parts by volume contains 100 parts of sodium chloride, 100 parts of crystalline copper sulphate and 50 parts by volume of 37% strength hydrochloric acid. The material is finally fixed in the usual manner. A yellow colour wedge is obtained which represents an image complementary to the original silver wedge and which is completely bleached in the areas of originally the highest silver density. Such a yellow image may also be part of a multi-colour material.

Similar results are obtained if instead of the dyestuff No. I another dyestuff of No. II to LXV of Tables I to VI is used.

EXAMPLE 13

The following layers are successively applied to an opqaue white acetate film provided with an adhesion layer:

1. Silver bromide emulsion in gelatine, sensitive to red, containing the greenish-blue dyestuff of formula

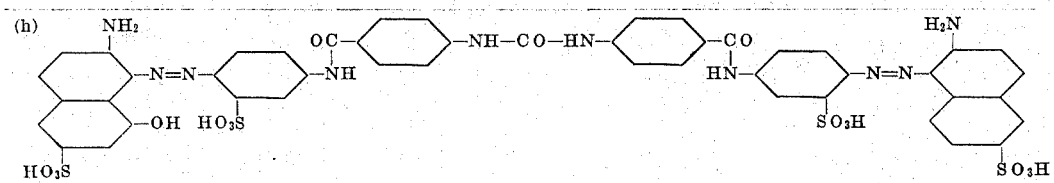

(g)

2. Colourless gelatine layer without silver halide.
3. Silver bromide emulsion in gelatine, sensitive to green, containing the purple dyestuff of formula

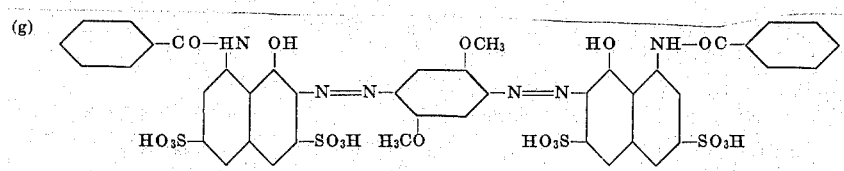

(h)

4. Silver bromide emulsion in gelatine, sensitive to blue, containing the yellow dyestuff No. III of Table I.

The gelatine layers may further contain additives such as wetting agents, hardeners and stabilisers for the silver halide. In other respects the procedure is that the individual layers contain, per square metre of film, 0.5 g of the particular dyestuff and the amount of silver bromide corresponding to 1–1.2 g of silver.

This film is exposed to red, green and blue copying light under a coloured diapositive. Thereafter the copy is developed in accordance with the following instructions:

1. 6 minutes development in a bath which per litre of water contains 50 g of anhydrous sodium sulphite, 0.2 g of 1-phenyl-3-pyrazolidone, 6 g of hydroquinone, 35 g of anhydrous sodium carbonate, 4 g of potassium bromide and 0.3 g of benztriazole;
2. 5 minutes soaking;
3. 6 minutes fixing in a solution of 200 g of crystalline sodium thiosulphate and 20 g of potassium metabisulphite in 1 litre of water;
4. 5 minutes soaking;
5. 3 to 12 minutes colour bleaching by means of a solution which per litre of water contains 50 to 80 g of potassium bromide, 40 to 80 g of thiourea, 35 to 80 g of 30% strength sulphuric acid and, if desired, 0.001 to 0.01 g of 2-amino-3-hydroxyphenazine;
6. 10 minutes soaking;
7. 5 minutes bleaching of residual silver by means of a solution of 60 g of crystalline copper sulphate, 80 g of potassium bromide and 15 ml of 30% strength hydrochloric acid per litre of water;
8. 5 minutes soaking;
9. 5 minutes fixing as specified under 3;
10. 5 minutes soaking.

A light-stable positive viewing image of the permanence required for documents is obtained.

Similar results are obtained if instead of the dyestuff No. III another dyestuff of No. I, II or IV to LXV is used.

We claim:

1. Photographic light-sensitive material which comprises, on a support, at least one silver halide layer and at least one layer contains an azo dyestuff of the formula

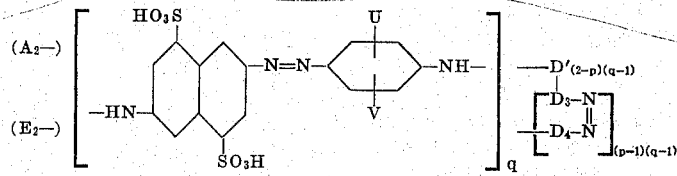

in which U is hydrogen, halogen, alkyl, alkoxy, hydroxyalkoxy, alkoxyalkoxy, carboxyalkoxy or acylamino, V is hydrogen, alkyl, alkoxy or acylamino, acyl in U and V is derived from an alkyl or hydroxyalkyl carboxylic acid, alkylendicarboxylic acid or from benzene, pyridine, furan or thiophene carboxylic acid or substituted benzene carboxylic acid, the substituents being alkyl, alkoxy, halogen or nitro, $A_2$ and $E_2$ each is $R_1$-CO- or an $R_2$-$SO_2$-, wherein $R_1$ is hydrogen, alkyl, halogen alkyl, phenylalkyl, alkoxy, carboxyalkyl, vinyl, benzene, furan, thiophene, pyridine, or benzene substituted by alkyl, alkoxy, halogen, nitro, halogenalkyl or sulfonyl, $R_2$ is alkyl, benzene or benzene substituted by alkyl, alkoxy or halogen, D' is pyrimidine, 1,3,5-triazine, 1,3,5-triazine substituted by hydroxyl, halogen, alkoxy having 1 to 5 carbon atoms, phenylamino or alkylamine having 1 to 5 carbon atoms, -CO-, -CO-F-CO- or -$SO_2$-$F_1$-$SO_2$-; wherein F is alkylene, benzene, furan, thiophene, pyridine, diphenylsulfone, -CH = CH- or substituted benzene, the substituents being amino, nitro, sulfonic acid or sulfonic acid amide; $F_1$ is benzene or substituted benzene, the substituents being amino, nitro, sulfonic acid or sulfonic acid amide, -$D_3$-N = N-$D_4$ represents a radical of the formula

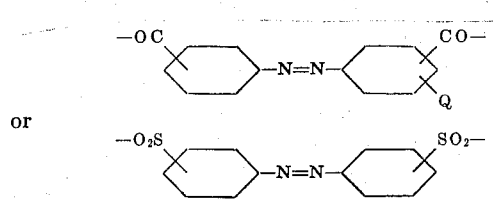

in which Q is hydrogen or alkoxy having 1 to 5 carbon atoms, and p and q each is 1 or 2.

2. Photographic material according to claim 1 in which one layer contains an azo dyestuff of the formula

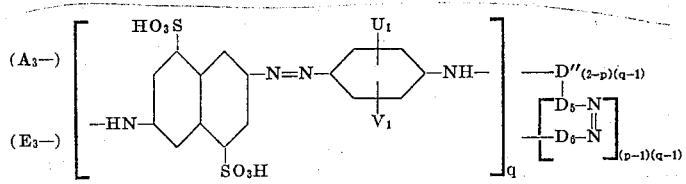

in which $U_1$ is hydrogen, chlorine, alkyl having 1 to 5 carbon atoms, alkoxy having 1 to 5 carbon atoms, hydroxyalkoxy having 1 to 5 carbon atoms, alkoxyalkoxy having twice 1 to 5 carbon atoms, carboxyalkoxy having 1 to 5 carbon atoms or acylamino, $V_1$ is hydrogen, alkyl having 1 to 5 carbon atoms, alkoxy having 1 to 5 carbon atoms or acylamino, acyl in $U_1$ and $V_1$ is derived from an alkyl carboxylic acid having 1 to 5 carbon atoms, or an alkylene dicarboxylic acid having 2 to 10 carbon atoms, $A_3$ and $E_3$ each is $R_3$-CO- or $R_4$-$SO_2$-, wherein $R_3$ is hydrogen, alkyl having 1 to 5 carbon atoms, chloroalkyl having 1 to 5 carbon atoms, phenylalkyl having 1 to 5 carbon atoms in the alkyl radical, alkoxy having 1 to 5 carbon atoms, carboxyalkyl having 1 to 5 carbon atoms, vinyl, benzene, furan, thiophene, pyridine or benzene substituted by alkyl having 1 to 5 carbon atoms, alkoxy having 1 to 5 carbon atoms, chlorine, nitro or chloroalkyl having 1 to 5 carbon atoms, $R_2$ is alkyl having 1 to 5 carbon atoms, phenyl or benzene substituted by alkyl having 1 to 5 carbon atoms, alkoxy having 1 to 5 carbon atoms, sulfonyl or chlorine, D'' is -CO-, -CO-$F_2$-CO- or -$SO_2$-$F_3$-$SO_2$-; in which $F_2$ is alkylene having 2 to 10 carbon atoms, benzene, furan, thiophene, pyridine, diphenylsulfone, -CH = CH- or benzene substituted by amino, nitro, sulfonic acid or sulfonic acid amide; $F_3$ is benzene, -$D_5$-N = N-$D_6$- is a radical of the formula

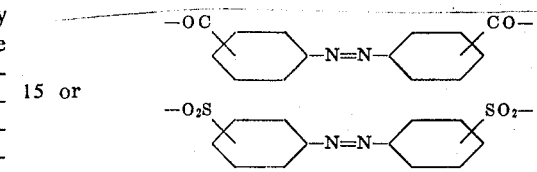

and p and q each is 1 or 2.

3. Photographic material according to claim 1 in which one layer contains an azo dyestuff of the formula

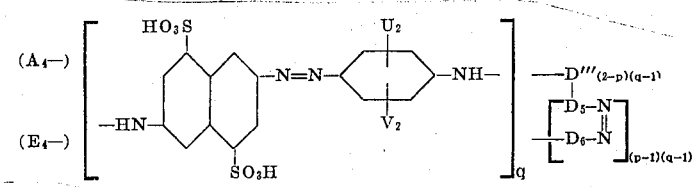

in which $U_2$ is hydrogen, alkyl having 1 or 2 carbon atoms, alkoxy having 1 or 2 carbon atoms, hydroxyalkoxy having at most 3 carbon atoms, carboxyalkoxy having at most 3 carbon atoms, or acylamino, $V_2$ is hydrogen, alkyl having 1 or 2 carbon atoms, alkoxy having 1 or 2 carbon atoms or acylamino, acyl in $U_2$ and $V_2$ being derived from an alkyl carboxylic acid having at most 3 carbon atoms or from an alkylene dicarboxylic acid having 2 to 6 carbon atoms, $A_4$ and $E_4$ each is $R_5$-CO- or $R_6$-$SO_2$-, in which $R_4$ is alkyl having 1 to 3 carbon atoms, phenyl, alkylphenyl having 1 to 3 carbon atoms in the alkyl radical or thiophene, $R_6$ is phenyl or alkylphenyl having 1 to 3 carbon atoms in the alkyl radical, D''' is -CO-, -CO-$F_4$-CO-, in which $F_4$ is benzene, furan, thiophene, pyridine, diphenylsulfone or -CH = CH, -$D_5$-N = N-$D_6$- is a radical of the formula

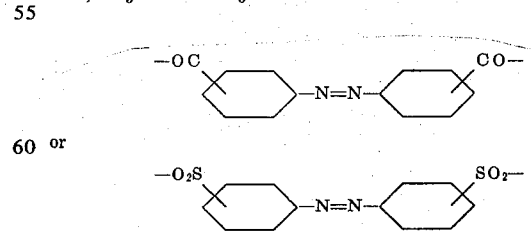

and p and q each is 1 or 2.

4. Photographic material according to claim 1 in which one layer contains an azo dyestuff of the formula

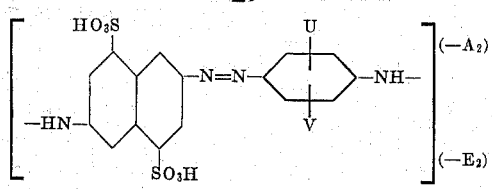

in which U, V, A₂ and E₂ have the significance indicated in claim 1.

5. Photographic material according to claim 1 in which one layer contains an azo dyestuff of the formula

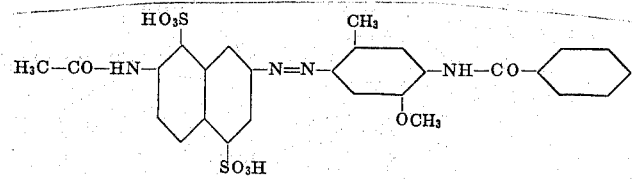

6. Photographic material according to claim 1 in which one layer contains an azo dyestuff of the formula

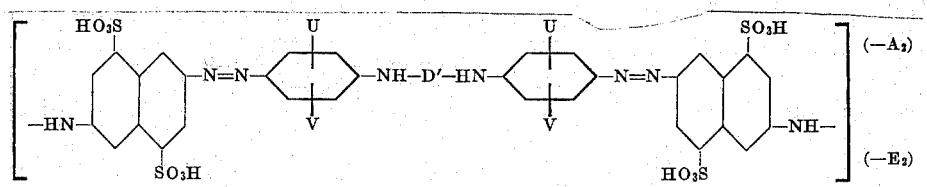

in which U, V, A₂, E₂ and D' have the significance indicated in claim 1.

7. Photographic material according to claim 1 in which one layer contains an azo dyestuff of the formula

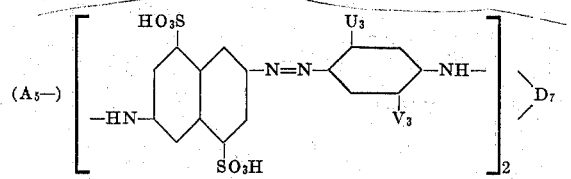

in which A₅ is acetyl, benzoyl, p-toluyl, p-tosyl or thienyl, D₇ is a radical of the formula

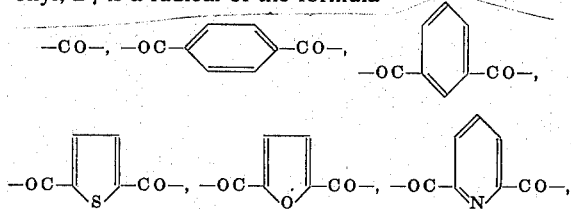

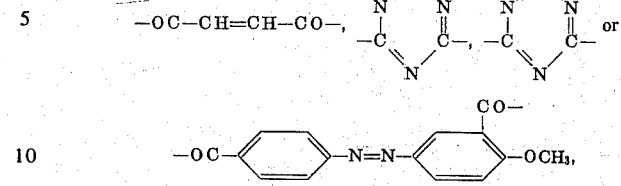

U₃ is hydrogen, methyl, methoxy, carboxymethoxy or carboxypropionylamino and V₃ is hydrogen, methyl, methoxy, hydroxyethoxy or acetylamino.

8. Photographic material according to claim 1 in which one layer contains an azo dyestuff of the formula

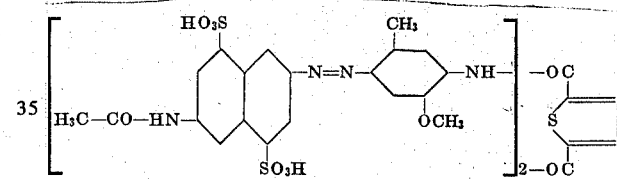

9. Photographic material according to claim 1 in which one layer contains an azo dyestuff of the formula

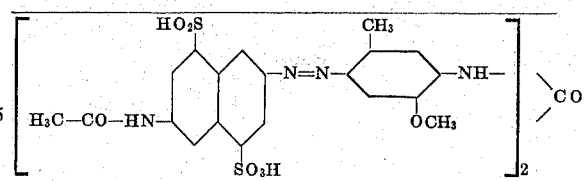

10. Photographic material according to claim 1 in which one layer contains an azo dyestuff of the formula

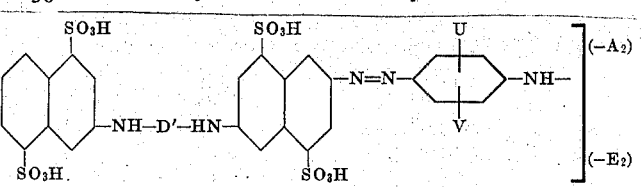

in which U, V, A₂, E₂ and D' have the significance indicated in claim 1.

11. Photographic material according to claim 1 in which one layer contains an azo dyestuff of the formula

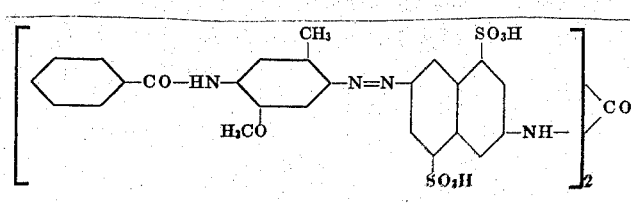

12. Photographic material according to claim 1 in which one layer contains an azo dyestuff of the formula

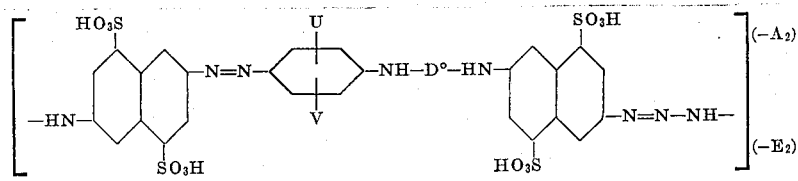

in which D° is 1,3,5-triazine, pyrimidine, substituted 1,3,5-triazine or substituted pyrimidine, the substituent being alkoxy having 1 to 5 carbon atoms, hydroxyl or halogen, and U, V, $A_2$ and $E_2$, have the significance indicated in claim 1.

13. Photographic material according to claim 1 in which one layer contains an azo dyestuff of the formula

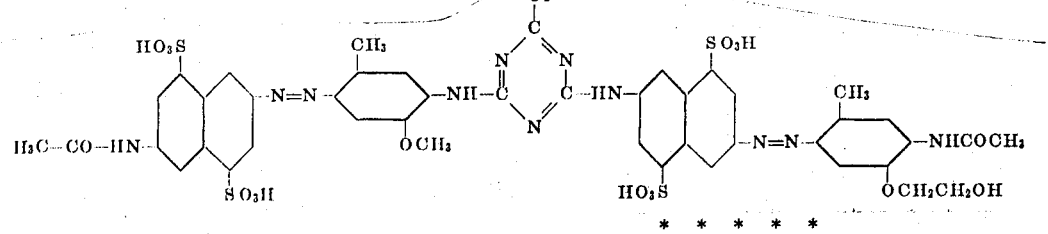

* * * * *